April 8, 1969
H. VERDIER
3,437,120
PNEUMATIC TIRES
Filed Dec. 9, 1966
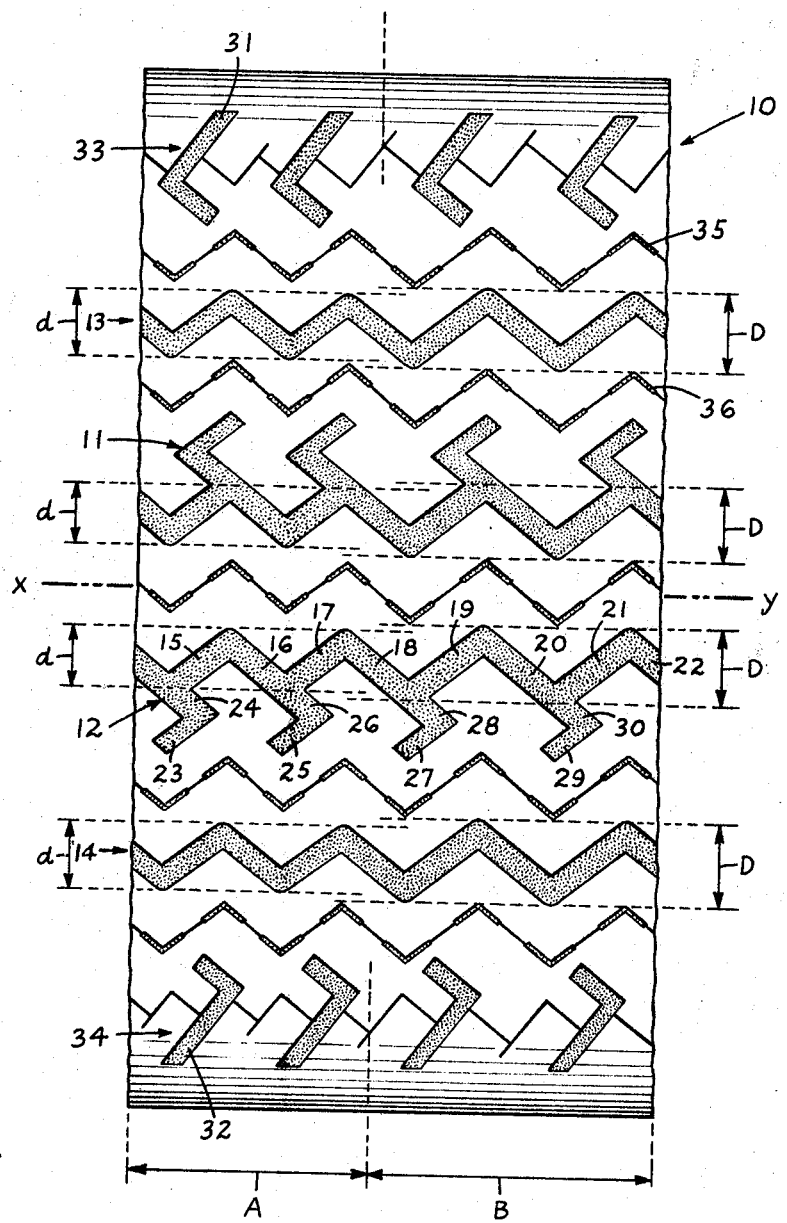
INVENTOR
HENRI VERDIER
BY
HIS ATTORNEYS United States Patent Office 3,437,120
Patented Apr. 8, 1969

3,437,120
PNEUMATIC TIRES
Henri Verdier, Beauregard-l'Eveque, France, assignor to Compagnie Generale des Etablissements Michelin raison sociale Michelin & Cie, Clermont-Ferrand, Puy-de-Dome, France
Filed Dec. 9, 1966, Ser. No. 600,520
Claims priority, application France, Dec. 11, 1965, 41,912
Int. Cl. B60c *11/00, 27/00*
U.S. Cl. 152—209        8 Claims

ABSTRACT OF THE DISCLOSURE

A tread for a radial carcass tire having a tread reinforcement comprising a ground contacting tread band having a plurality of wavy grooves therein extending circumferentially of the tire in mid and lateral zones of said band, and in which the peripheral grooves in the mid-portion or zone extend over a transverse width greater than the grooves in the lateral or outer zones of the tread.

---

This invention refers to improvements in pneumatic tires and more particularly to improvements in the tread patterns of radial carcass tires, i.e., tires having a carcass formed of cords or cables arranged in radial planes and having a tread which is stiffened by means of a tread or crown reinforcement.

The principal purpose of the ground-contacting tread which contains grooves and ribs or blocks is to improve the adhesion of the tread to the ground. However, the tread must be designed in such a manner as not to wear off excessively, not to cause disagreeable noise during rolling, to be easily produced and to have an esthetically pleasing appearance. Generally, the type of pattern which is simplest and is used most often consists of repetition of a basic motive in both the transverse and the longitudinal directions, in a manner whereby the tread contains a number of continuous grooves extending circumferentially of the tire in spaced-apart, generally parallel relation. This type of tread is used on radial-carcass tires and on conventional tires having a carcass formed of bias-laid plies of cords.

It has been found that this general type of tread pattern can be modified to adapt it to radial carcass tires in a particularly advantageous manner leading to an improvement in roadability while retaining all other desirable characteristics.

In accordance with the invention, a tread suitable for a radial-carcass tire includes a plurality of continuous grooves extending in peripheral direction and having a zigzag or wavy configuration, and in which peripheral grooves in the mid-portion or zone of the tread extend over a transverse width greater than the grooves in the lateral or outer zones of the tread.

More particularly, the width of the peripheral grooves can be varied by providing wavy or zigzag grooves of greater amplitude in the mid-zone of the tread than in its lateral zones or side. More particularly, the amplitude of the wavy or zigzag grooves has a value which is larger for the center grooves than for the lateral grooves, or the amplitudes of all of the wavy or zigzag grooves can be equal or substantially equal and lateral extensions can be joined to the centrally located groove or grooves in such a manner as to increase the width of the centrally located grooves. These extensions may be provided on both sides of the peripheral groove or grooves or on one side only thereof.

The various peripheral grooves may be equidistant from one another but by preference, two adjacent peripheral grooves are closer to each other in the mid-zone of the tread than in the lateral zones. In other words, the center zone of the tread has a greater grooved or cut-away area than the lateral zones, i.e., a larger proportion of recessed surfaces.

In order to eliminate or reduce tire noise, the peripheral grooves may have variable spacing, i.e., the elemental motives or patterns following each other in the peripheral direction are not rigorously identical but may have two or more motives of slightly different lengths which follow one another in a predetermined order. For example, with two motives or patterns of wavy or zigzag grooves A and B of different lengths and amplitudes, a law of succession of AA, BA, BB or AAA, BBB or any other order can be followed.

From the standpoints of effectiveness and esthetics, the various groove motives or patterns having different lengths may be formed by varying the amplitude of the wavy or zigzag grooves while maintaining constant the angles formed with the longitudinal direction, rather than by maintaining their amplitude constant and by varying the angles of the waves of the grooves. Likewise, the various slits and cutouts making up the tread pattern may be arranged parallel with the wavy or inclined portions of the grooves and optimally all the elements of the tread pattern, e.g., grooves, slits or cutouts, are parallel to two directions only.

The parallel relation of the various grooves, slits and cutouts makes possible a uniformity in the shape of the ribs or blocks of the tread, thereby enabling the resistance of the tread to wear and tear and deformation to be rendered more uniform throughout the tread. This tread construction favorably completes the basic pattern which provides for a large proportion of grooves or recesses in the center of the tread. Furthermore, by providing motives or groove patterns with constant or equal angles but variable amplitude, variations in the grooves along their lengths in a recurring order are not noticeable. The lengths of recurring motives may vary by 10% or more over the mean value without this being noticeable, especially if the wavy or zigzag configurations of the transversely spaced grooves are in phase. Moreover, the inclusion of equiangularly related segments in the grooves improves roadability due to a greater average amplitude of the rise and fall and the width of the peripheral grooves.

Tread constructions in accordance with the invention increase the number of the transverse grooves and their density, especially in the center part of the tread, which improves road adherence in tires of the radial-carcass type. Such tread patterns are, however, suitable only for tires of the radial type, for it is only in this type of tire that the advantages obtained by the new tread are not offset by various serious disadvantages. In a radial-carcass tire having a tread reinforcement of crossed plies and low circumferential flexibilty, transverse grooves improve the longitudinal flexibility of the tread enabling it to absorb more easily shocks and sudden stoppages without increasing noticeably the wear of the tire. A conventional tire without tread reinforcement normally has a longitudinal flexibility which is too high for best roadability and is the cause of excessive wear and tear, and transverse grooves render the treads of such tires even more flexible.

For a better understanding of the invention, reference may be had to the accompanying drawings, in which, The single figure is a plan view of a portion of the tread of a radial carcass embodying the present invention.

As illustrated in the drawing, the tread 10 has two continuous center grooves 11 and 12 and two continuous lateral grooves 13 and 14 which extend around the entire periphery or circumference of the tread.

Each of the grooves 11 to 14 is of wavy or zigzag formation composed of repetitive segments 15, 16, 17, 18, 19, 20, 21, 22, etc., all parallel to two directions, i.e., in equiangular relation. The two center grooves 11 and 12 include, in addition, the L-shaped groove extensions 23, 24, 25, 26, 27, 28, 29 30, etc., which increase the width of the grooves 11 and 12 relative to the grooves 13 and 14 which are devoid of such extensions. The grooves 23 to 30, etc., are illustrated as extending outwardly from one side of each of the grooves 11 and 12. However, the L-shaped grooves can be distributed on opposite sides of each of the grooves 11 and 12, for example, alternately on opposite sides of the grooves 11 and 12. In the relation disclosed, the transverse distance between corresponding points of the grooves 11 and 12 is less than the transverse distance between corresponding points of the grooves 11 and 13 and 12 and 14.

The L-shaped grooves 23 to 30, etc., have the same depth as the grooves 11 and 12 with which they are joined, but the grooves 23 to 30, etc., may, if desired, be shallower than the grooves 11 and 12.

Inasmuch as the amount of generally transversely extending grooving improves road adherence during turning of a vehicle and does not adversely affect the other properties of radial tires having a tread reinforcement, supplementary separate L-shaped grooves 31, 32, etc., forming discontinuous rows 33 and 34 are provided in the region of the shoulders of the tire. The sides of the L-shaped grooves 31, 32, etc., are substantially parallel with the sides of the L-shaped grooves 23 to 30 and in phase with them.

The groove pattern also may include narrow zigzag slits 35, 36, etc. which, for purposes of illustration are shown in double lines, indicating greater depth, and single lines, indicating shallower depth. These slits are interspersed between the grooves 11 to 14 in order to improve road adherence and further are arranged substantially parallel with and in about the same spacing as the segments of the grooves 11 to 14.

The portion of the tread which is shown includes two sets of grooves of different wave amplitudes and of different lengths. As shown in the figure, the wave amplitude of the grooves 11 to 14 in section A of the tread is less than the amplitude of these grooves in section B of the tread. The ratio of their lengths is approximately 9/11, i.e., the length A is 10% less than the mean $A+B/2$ and the length B is 10% greater than the mean.

Variation of the amplitude and length of the wavy or zigzag grooves, without the variation becoming noticeable, is due to the fact that the same angles are formed by the segments 15 to 22 with respect to the longitudinal $x$-$y$ or median plane in sections A and B of the tread. In section A, all of the grooves 11 to 14 and the grooves 33, 34 and 36 and 36 have an amplitude $d$ which is less than the amplitude D of these grooves in the section B.

Sections A and B can be arranged in any regular order, for example AAA, BBB, i.e., three A sections, then three B sections, etc. Other arrangements, such as alternate A and B sections or multiples of one section interspersed regularly with single other sections and the like are possible.

It will be understood that the grooves in the tread band may be of different configurations than that shown in the drawing, that the circumferential grooves may be wider or narrower and that tires embodying the principles of the tread patterns set forth above may be provided for conventional use, for snow tires and the like.

I claim:
1. A tread for a radial carcass tire having a tread reinforcement comprising a ground contacting tread band having a plurality of wavy grooves therein extending circumferentially of said tire in mid and lateral zones of said band, said grooves being spaced apart transversely of said tread band in substantially parallel relation and the grooves in the mid zone of said tread band occupying portions of said band having a greater transverse width than the width of the portions of said band occupied by the grooves in the lateral zones of said tread band, the transverse distance between corresponding points of said mid zone grooves being less than the transverse distance between corresponding points of said mid zone grooves and said lateral zone grooves.

2. The tread set forth in claim 1 in which all of the said circumferential grooves have a wavy configuration and comprising other grooves extending laterally from the grooves in said mid zone of said tread band increasing the transverse width of the portions of said band occupied by said grooves in said mid zone.

3. The tread set forth in claim 2 in which said wavy grooves and said other grooves are composed of substantially straight, angularly related segments extending parallel to only two directions.

4. A tread for a radial carcass tire having a tread reinforcement comprising a ground contacting tread band having a plurality of wavy grooves therein extending circumferentially of said tire in mid and lateral zones of said band, said grooves being spaced apart transversely of said tread band in substantially parallel relation and the grooves in the mid zone of said tread band occupying portions of said band having a greater transverse width than the width of the portions of said band occupied by the grooves in the lateral zones of said tread band, said wavy grooves varying in amplitude in a repetitive pattern throughout the length of said tread band.

5. The tread set forth in claim 4 in which said wavy grooves comprise a plurality of substantially equiangularly related segments throughout their lengths, the lengths of said segments varying in proportion to the amplitudes of said wavy grooves.

6. The tread set forth in claim 4 comprising substantially L-shaped grooves extending laterally from said grooves in said mid zone of said tread band and L-shaped grooves having angularly related segments substantially parallel with said wavy grooves.

7. The tread set forth in claim 4 comprising slits interposed between said wavy grooves and composed of angularly related segments, said wavy grooves being composed of angularly related segments, said segments of said slits and said wavy grooves being substantially parallel to only two directions.

8. The tread set forth in claim 4 comprising substantially L-shaped grooves extending laterally from said wavy grooves in said mid zone of said tread band, said L-shaped grooves having angularly related segments, slits interposed between said wavy grooves and composed of angularly related segments, said wavy grooves being composed of angularly related segments, said segments of said slits, L-shaped grooves and wavy grooves being substantially parallel to only two directions.

References Cited
UNITED STATES PATENTS

| | | | |
|---|---|---|---|
| 2,155,972 | 4/1939 | Hower | 152—209 |
| 2,255,994 | 9/1941 | Bush | 152—209 |
| 2,756,798 | 7/1956 | Palko et al. | 152—209 |
| 3,023,798 | 3/1962 | Moore et al. | 152—209 |

FOREIGN PATENTS

| | | |
|---|---|---|
| 401,479 | 11/1933 | Great Britain. |
| 418,820 | 11/1934 | Great Britain. |

DRAYTON E. HOFFMAN, *Primary Examiner.*